United States Patent
Harwood

[15] 3,637,523
[45] Jan. 25, 1972

[54] ESTERS OF GLYCEROL AND POLYHYDRIC ALCOHOL COPOLYMERS USEFUL AS EMULSIFYING AGENTS AND PROCESS FOR THEIR PRODUCTION

[72] Inventor: James Harwood, Chicago, Ill.
[73] Assignee: SCM Corporation, Cleveland, Ohio
[22] Filed: Sept. 12, 1968
[21] Appl. No.: 759,496

[52] U.S. Cl. .................................... 252/356, 99/1, 99/92, 99/118 R, 99/121, 99/123, 99/139, 252/309, 252/312, 260/410.6, 260/410.7, 424/172
[51] Int. Cl. .................................................. B01f 17/34
[58] Field of Search ................... 99/92; 252/356; 260/410.6, 260/410.7

[56] References Cited

UNITED STATES PATENTS

| | | | |
|---|---|---|---|
| 2,223,558 | 12/1940 | Epstein | 252/356 X |
| 2,275,494 | 3/1942 | Bennett | 252/356 X |
| 2,360,393 | 10/1944 | Burrell | 260/410.6 |
| 2,597,204 | 5/1952 | Todd et al | 252/340 |
| 3,034,898 | 5/1962 | Kuhrt | 252/356 X |

Primary Examiner—Richard D. Lovering
Attorney—M. H. Douthitt, Howard G. Bruss, Jr. and Harold M. Baum

[57] ABSTRACT

This invention relates to a class of emulsifying agents which have been found to be particularly useful in food and bakery products. Basically, the emulsifying agents are esters of a copolymer of glycerin and a polyhydric alcohol other than glycerin. The polyhydric alcohol employed can have from two to six carbon atoms in the molecular structure. The mole ratio of glycerin to polyhydric alcohol is from about 0.1:1 to 10:1. The esters are produced generally by reacting the copolymer with a carboxylic acid or carboxylic acid radical donating compound which has from eight to 22 carbon atoms and, preferably, the acid radical donated is a fatty acid radical.

8 Claims, No Drawings

ESTERS OF GLYCEROL AND POLYHYDRIC ALCOHOL COPOLYMERS USEFUL AS EMULSIFYING AGENTS AND PROCESS FOR THEIR PRODUCTION

Heretofore, fatty acid ester of polygylcerin and fatty acid esters of polyglycols have been prepared and found useful as emulsifying agents. Emulsifying agents of the present invention comprise the carboxylic acid esters of a copolymer of glycerin and polyhydric alcohol other than glycerin having from two to six carbon atoms in the structure. This class of emulsifying agents provides great flexibility in the type products that can be produced. A wide and controlled variety of compounds are produced in the copolymerization of glycerin and polyhydric alcohol, and this is not duplicated in the homopolymerization of polyols such as glycerin.

The emulsifying agents contemplated by this invention are particularly useful in stabilizing emulsions for such products as cosmetics, margarine, various bakery products, cake icings, gloss enhancers for domestic butters, shortenings, and whipped toppings. Although no one particular esterified copolymer is generally suitable for all of the specific applications, the degree of polymerization, acylation, esterification, and chain lengths of the acyl groups in the ester can be altered to produce a product suitable for use in many of the areas even though the reactants are unchanged. The invention in its broadest aspect relates to carboxylic acid esters of a copolymer of glycerin and a polyhydric alcohol, other than glycerin, having from two to six carbon atoms in the structure. The carboxylic acid radical is preferably a fatty acid radical having from eight to 22 carbon atoms.

By a polyhydric alcohol, I refer to those alcohols which contain two or more hydroxyl units in the structure. They can also have one hydroxyl unit per carbon atom or less than one unit per carbon atom. The polyhydric alcohol can have from two to six carbon atoms; although glycerin falls within my definition of a polyhydric alcohol, it is excluded as a polyhydric alcohol because the reaction product would consist of essentially a homopolymer of glycerin instead of a copolymer.

The polyhydric alcohols employed in this invention can be aliphatic or cyclic saturated aliphatic alcohols. Examples of such alcohols are propanediol, ethylene glycol, butanediol, and sorbitol. The limitation of six carbon atoms in the chain is established mainly for reasons of efficiency and economy. Alcohols having more than six carbon atoms have a higher melting point than is desired; but more importantly, these alcohols do not have the desired lipid solubility; higher melting points and reduced lipid solubility makes the formation of the copolymer more difficult.

The carboxylic acids are generally the aliphatic and olefinically unsaturated acids having from eight to 22 carbon atoms in the structure. The acids can be monocarboxylic or polycarboxylic. When esterifying the copolymer in the one step preparation of the novel emulsifying agent, the carboxylic acid can be added in the acid form or in an acid-radical donating form, such as the ester of glycerin. Preferred acid radical donating forms are the mono- or diglycerides. However, I can also use the esters of polyhydric alcohols other than glycerin as the acid radical donating form.

Acids having over 22 carbon atoms are not included in this invention for reasons of efficiency and economy. Preferred carboxylic acids are the members of the higher fatty acid series, such as stearic, oleic, and palmitic acids.

In producing the ester, I add an amount of acid sufficient to produce an ester, having a degree of esterification, i.e., the ratio of ester units per hydroxyl units in the emulsifying agent, suitable for a good emulsifying agent. A good emulsifier has a hydrophilic-lipophilic balance such that it will mix well with oil and water systems. Generally a preferred ratio for the emulsifying agent is from about one ester unit for about every four hydroxyl units. I can sometimes reduce the amount of acid employed in the reaction and ultimately reduce the degree of esterification in the emulsifying agent to yield a ratio of about one-half ester unit per four hydroxyl units and yet obtain a good emulsifying agent. Usually this reduced ratio is suitable for high molecular weight copolymers (above 2,000).

The emulsifying agents having a degree of the esterification less than one-half unit tend to become fat insoluble or hydrophilic. I can increase the amount of acid employed in the reaction, thus increase the degree of esterification to yield a ratio of about two ester units per four hydroxyl units without the emulsifying agent losing its desired hydrophilic-hydrophobic properties. The emulsifying agent, when having a degree of esterification above about two to two and one-half ester units per four hydroxyl units, tends to become too hydrophobic.

The copolymerization reaction between glycerin and the polyhydric alcohol reaction is carried out much the same way as is done with glycerin alone, but often the copolymerization reaction requires higher temperatures and higher pressures; and typically, the reaction can be carried out at temperatures of about 180° to about 300° C. and pressures from about 5 p.s.i. to about 1,000 p.s.i. Preferred reaction conditions are from 220° to 270° C. and at atmospheric pressure. Because the copolymerization reaction and esterification reaction proceed at about the same temperature and same pressure, the reactions can be combined; and as a result, I can produce the emulsifying agent in one step. To facilitate the copolymerization, I generally add conventional alkaline catalysts such as potassium hydroxide, sodium hydroxide, and sodium acetate.

The mole ratio of glycerin to polyhydric alcohol in the copolymer can range from about 0.1:1 to about 10:1, but preferred mole ratios are from about 1:1 to about 4:1. Ratios of less than 0.1 mole of glycerin to 1 mole of polyhydric alcohol are not preferred because the effect of the polyhydric alcohol, and its contributing properties to the emulsifying agent are substantially lost. Where the ratio of polyhydric alcohol to glycerin above 10:1, the polymerization is extremely difficult because the polyhydric alcohol does not easily polymerize itself. The molecular weight of the copolymer formed by the copolymerization of glycerin and polyhydric alcohol can be from about 100 to about 5,000; and the preferred molecular weights are from about 200 to about 1,000.

To determine the average extent of polymerization of the reactants, the copolymer normally is analyzed for hydroxyl value. This test is well known by those in the art. The hydroxyl value is useful in another way in that it provides an easy method for calculating the amount of acid or fatty acid glycerides to be used in the formation of the esterified emulsifying agent. Normal hydroxyl values for the copolymer are from about 300 to 1,300.

The following examples are given to illustrate methods of preparing and utilizing the invention and are not intended to limit the scope of the invention. All parts are parts by weight and all percents, percents by weight. All temperatures are in degrees centigrade, unless otherwise specified.

EXAMPLE 1

Ninety-two parts of glycerin, 76 parts of propylene glycol and, 0.5 part of sodium hydroxide were mixed and heated in a flask, fitted to a distillation column, for 7 days. A nitrogen purge was passed over the mixture continuously during the heating, and condensate was removed during this stage. When the head temperature reached 235°, the heating was discontinued. Thirty milliliters of condensate had been collected, and when evaporated, yielded 8.9 parts residue. The product in the column was distilled at a head temperature of 130° and a pressure of 0.3 millimeters. Eighty-four and six-tenths parts product was obtained. The product comprised a copolymer plus polyglycerol forms such as tetraglycerol, pentaglycerol, hexaglycerol, and heptaglycerol. The predominant polyglycerols were di- and triglycerol.

While not intending to be bound by theory, it is believed that the formula of one of the copolymers is as follows ($HOCH_2CHOHCH_{22}CHOHCH_3$).

The copolymer produced was treated with (198.8 parts) stearic acid at a temperature of 225°, maintaining a nitrogen blanket for about 6 hours. The analysis showed a product having a micromelting point of 44.2°, an ester value of 121.0, and a hydroxyl value of 373.6.

EXAMPLE 2

The same procedure as described in example 1 was used to produce a copolymer having 0.2 mole glycerin per mole of propylene glycol. The copolymer produced was then reacted with stearic acid to yield the ester.

EXAMPLE 3

One part propylene glycol, one part glycerol and 0.7 part stearic acid were heated at a temperature of 250° and atmospheric pressure for 6 hours. An esterified copolymer was produced. The resultant product was tan colored and produced a milky dispersion when immersed in water.

EXAMPLE 4

One part sodium hydroxide was dissolved in a mixture of 64.4 parts glycerin and 68.4 parts propylene glycol. This mixture was heated to a temperature of 240°. Immediately after reaching this temperature, 170 parts of hydrogenated Ranchers stearine, (a triglyceride of stearic and palmitic acid) was added. The heating was continued and the mixture contained under a nitrogen blanket for 19 hours. Twenty-three parts of water were collected, and 262.5 parts of an esterified copolymer was yielded.

EXAMPLE 5

One hundred eighty-four parts of glycerin, 91 parts of sorbitol, and 1½ parts of sodium hydroxide was heated at a temperature of 260°. The mixture was purged with nitrogen to maintain a relatively inert atmosphere. After heating for 3 hours 37 milliliters of water was collected, then, the heating was discontinued. This product had a hydroxyl value of 1,263.

A mixture of 38 g. of this copolymer with 50 g. of stearic acid was heated and stirred under nitrogen at 250°–255° for 1 hour. This copolymer ester had a hydroxyl value of 313.0 and an ester value of 131.7. The product was soluble in hot soybean oil and precipitated when the oil was cooled to room temperature. The product had a tan colored appearance and a micromelting point of 53.8°.

While not intending to be bound by theory, it is believed that the formula of one of the copolymers is as follows:

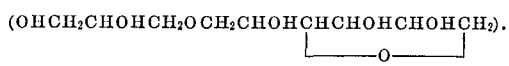

Many other formulas are possible but are not included.

EXAMPLE 6

Yellow cakes of an industrial type prepared from shortenings which comprised the emulsifying agent of a propylene glycol-glycerol stearate ester as prepared by the description of example 1 were tested for aerating properties imparted by the fluid shortenings. Additions of the emulsifier was added at three levels. The sole emulsifier was the example 1 ester added at a level of 3 and 9 percent; a third using 6 percent of the example 1 ester and 1 percent marvic acid. The shortening used in the yellow cake mixes was prepared as follows:

Shortening 1. A shortening containing 3 percent emulsifier was prepared by dissolving 12 parts emulsifier in 388 parts of salad oil and mixed at 170° F. to yield 400 parts shortening. The shortening was then cooled to 70° F.

Shortening 2. A shortening containing 9 percent emulsifier was prepared by dissolving 27 parts emulsifier in 273 parts of S.B. salad oil and mixed at 170° F. and then cooled to 70° F.

Shortening 3. A shortening containing 6 percent emulsifier and 1 percent marvic acid was prepared by dissolving 18 parts emulsifier, 3 parts marvic acid, and 281 parts S.B. oil to yield 300 parts shortening. The mixture was heated to 170° F., then cooled to 70° F.

The three shortenings prepared in the above manner were then added to cake mixes of the following composition:

| Cake mix I | Cake mix II |
|---|---|
| 369 parts shortening 1 | 277 parts shortening 2 |
| 737 parts cake flour | 700 parts flour |
| 977 parts granulated sugar | 829 parts sugar |
| 71 parts milk powder | 69 parts milk solids |
| 28 parts salt | 21 parts salt |
| 43 parts baking powder | 28 parts baking powder |
| 682 parts water | 627 parts water |
| 454 parts whole eggs | 350 parts whole eggs |
| 14 parts vanilla | 21 parts vanilla |

Cake mix III

| | |
|---|---|
| 277 parts shortening 3 | 28 parts baking powder |
| 700 parts flour | 627 parts water |
| 829 parts sugar | 350 parts whole eggs |
| 69 parts milk solids | 21 parts vanilla |
| 21 parts salt | |

Each of the above cake mixes were mixed with a vertical mixer (household type) to yield a substantially homogeneous cake batter. The cakes were produced from the above cake mixes by baking at a temperature of 360° F. for 30 minutes. Cake I had a specific gravity of 1.02/1,557 cc./lb.; cake II had a specific gravity of 0.870/1,577 cc./lb.; and cake III had a specific gravity of 0.81/1,532 cc./lb. A criteria of 0.75/1,600 cc./lb. for cake I, 0.85/1,550 cc./lb. for cake II, and 0.79/1,600 cc./lb. for cake III respectively has been established.

EXAMPLE 7

The emulsifying agent consisting of polymerized glycerin and propylene glycol in the stearate ester form prepared as described in example 1 was added to domestic-type hard butter to determine the film-forming ability of these emulsifiers. The following emulsifier-hard butter blends were prepared:

1. Six percent emulsifier with 94 percent Kaomel (fractionated cottonseed oil having a wiley melting point from 96° to 98° F.),
2. Six percent emulsifier, 1 percent lecithin (glyceryl phosphoric acid esters referred to as phosphatides), and 93 percent Kaomel,
3. Five percent emulsifier, 1 percent lecithin, and 94 percent paramount B, (hydrogenated palm kernel oil having a wiley melting point of 92° F.),
4. Five percent emulsifier, 2 percent lecithin, 93 percent paramount B.

These hard butter blends were heated to melting for proper mixing. All samples were placed in a 60° F. box for 30 minutes and tested for glossiness of the resultant hard butter. Each sample exhibited a slight gloss, thus showing that the emulsifying agent is functional as a film-forming gloss enhancer for domestic hard butters.

A glycerol-sorbitol stearate ester as described in example 3 was compared with the ester of example 1. The appearance of hard butter at 60° F. on solidification was glossy. A slight film was noticed when 1 percent lecithin was used, but no film was observed in the case of the 6 percent emulsifier alone. Although the ester of example 3 exhibits film-forming functionality, it is not as functional as the ester of example 1.

EXAMPLE 8

The emulsifiers of examples 1 and 3 were tested for foaming properties wherein various amounts of emulsifier are added to water and to oil. The resultant water and oil systems were tested for specific gravity. The experiment is useful to determine the aerating tendencies of emulsifying agents and at what levels they are effective in aqueous and lipid systems. The emulsifier additions were 0.5, 1, 2, and 3 percent in water systems and 2, 5, 8, 10, and 15 percent in oil systems. Each system is prepared by melting the emulsifier and blending in water or in oil, whichever system is to be used. The specific gravity criteria for the water system is 0.2, and 0.3 or less for specific gravity in the oil system. Additionally, both systems should be stable.

Specific gravities of 0.13, 0.23, 0.15, and 0.13 were recorded for the various levels of emulsifier in the water system. The oil system showed 0.27 as a specific gravity at the 15 percent addition. Other levels of the emulsifier were non-functional.

EXAMPLE 9

The glycerol-sorbitol stearate ester form, as produced according to example 3, was evaluated as an emulsifier for whipped toppings. The whipped topping had the following composition:

210 parts water
35 parts sugar
1.8 parts Avicel (mixture of microcrystalline cellulose and carboxy-methyl cellulose)
7 parts caseinate
3.2 parts emulsifier
98 parts paramount C (hydrogenated palm kernel oil)

This mixture was heated to 160° F. and mixed for about 30 minutes, then passed through a homogenizer and cooled to 40° F. The homogenized mixture was frozen at a temperature of about 20° F. and maintained at that temperature for a period of about 16 hours. The frozen mixture was then allowed to thaw at refrigerator temperatures; and when completely thawed it was whipped using a conventional household mixture. The criteria used in evaluating these whipped toppings is as follows: specific gravities of more than 0.45 are recorded no good; from 0.35 to 0.45 is considered to be useful with other emulsifiers; and less than 0.35 is rated acceptable by themselves. Specific gravities of 0.370 and 0.354 were recorded for whipping times of 3 minutes and 5 minutes. The experimental emulsifiers contemplated by this invention were compared with a mixture of two commercial emulsifiers, one comprising $\alpha$-monoglycerides and hydrogenated lard; and the other, monoglycerides and soybean oil. The mixture of commercially accepted emulsifiers had a specific gravity of 0.371 and 0.390 at whipping times of 3 minutes and 5 minutes respectively. These results show that the new class of emulsifier is comparable to commercially accepted emulsifiers for whipped toppings.

Having thus described the invention, what is claimed is:

1. An emulsifying agent consisting essentially of esterified copolymers of glycerin and a polyhydric alcohol, said esterified copolymers produced from the polymerization reaction of glycerin, and at least one polyhydric alcohol other than glycerin selected from the group consisting of aliphatic and cyclic saturated aliphatic alcohols having from two to six carbon atoms in a ratio of from about 0.1:1 to 10:1 moles glycerin per mole of polyhydric alcohol and said copolymers having a molecular weight between 100 and 5,000 and said copolymers esterified by reacting with a higher fatty acid in a proportion sufficient for producing from between about one-half to two ester groups per four hydroxyl groups in said copolymers.

2. The emulsifying agent claim 1, wherein the ratio of glycerin to polyhydric alcohol is between about 1:1 to 4:1 moles glycerin per mole of polyhydric alcohol, the molecular weight of the copolymers being between about 200–1,000 and the degree of esterification is about one ester group per four hydroxyl groups.

3. The emulsifying agents claim 1, wherein said polyhydric alcohol is propylene glycol and said fatty acid has from 15–20 carbon atoms.

4. The emulsifying agent of claim 2, wherein said polyhydric alcohol is sorbitol and said fatty acid has from 15–20 carbon atoms.

5. The process for producing an emulsifying agent which comprises the steps of:

forming copolymers of glycerin and at least one polyhydric alcohol other than glycerin selected from the group consisting of aliphatic and cyclic saturated aliphatic alcohols having from two to six carbon atoms, the ratio of glycerin to polyhydric alcohol being from about 0.1:1 to 10:1 moles glycerin per mole of polyhydric alcohol by polymerizing glycerin and said polyhydric alcohol, said copolymers having a molecular weight of between about 100 and 5,000; and esterifying said copolymers with a fatty acid having from eight to 22 carbon atoms producing esterified copolymers having from about one-half to two ester groups per four hydroxyl groups in said copolymers.

6. The process of claim 5, wherein said forming is at a temperature between 180°–300° C. in the presence of an alkali metal hydroxide catalyst, said ratio of glycerin to polyhydric alcohol is between about 1:1 to 4:1, said molecular weight is between about 200–1,000 and said esterification is about one ester group per four hydroxyl groups in said copolymers, and said polymerization and said esterification are carried out simultaneously.

7. The process of claim 6, wherein said polyhydric alcohol is sorbitol and said fatty acid has from 15–20 carbon atoms in the structure.

8. The process of claim 6, wherein said polyhydric alcohol is propylene glycol and said fatty acid has from 15–20 carbon atoms in the structure.

* * * * *